F. H. SAUER.
AIR VALVE.
APPLICATION FILED NOV. 7, 1910.
994,481.
Patented June 6, 1911.
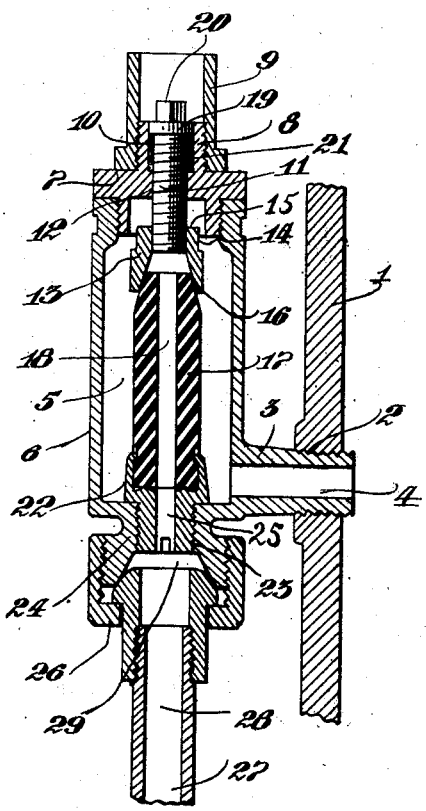

UNITED STATES PATENT OFFICE.

FREDERICK H. SAUER, OF NEW YORK, N. Y.

AIR-VALVE.

994,481.  Specification of Letters Patent.  Patented June 6, 1911.

Application filed November 7, 1910. Serial No. 591,120½.

*To all whom it may concern:*

Be it known that I, FREDERICK H. SAUER, a citizen of the United States, residing at New York city, in the county of New York and State of New York, have invented a new and useful Improvement in Air-Valves, of which the following is a specification.

The invention relates to improvements in air valves for radiators and has particular reference to that type of valve provided with means for controlling the instantaneous passage of vaporous fluids from said valve.

The object of the invention is the providing of a valve having associated therewith means for permitting the internal adjustment of said valve without removing any part of the same thereby rendering the structure one that may be advantageously used in air valves provided with air line connections.

In the following is described in connection with the accompanying drawings one embodiment of the invention the features thereof being more particularly pointed out hereinafter in the claim.

In the drawing the figure as shown is a longitudinal sectional view of the valve illustrating in connection therewith the manner in which said valve is attached to an adjacent radiator and an air exhaust pipe line connection.

In the drawing 1 indicates the conventional outline of a radiator provided with a threaded aperture 2 adapted to receive a threaded communicating pipe connection 3 provided with a passage 4 which forms the means of communication between the interior recesses of said radiator 1 and the interior chamber 5 of valve casing 6. Said valve casing 6 is internally threaded at its upper end to receive primary cap 7 which has formed on its extreme upper end a threaded shoulder 8 adapted to receive an auxiliary protective cap or housing 9. Said cap 7 has formed in shoulder 8 thereof a recess 10 adapted to receive adjusting screw 11 which engages a threaded bore 12 in said cap 7 the lower end of said screw 11 having mounted thereon a metallic hood 13 provided with an upwardly projecting shoulder 14 adapted to act as a seat 15 when the adjusting screw is in its lifted position. The object of said seat 15 is also to provide means adapted to prevent the removal of the adjusting screw 11 from said valve. The inner part of said hood 13 is tapered as at 16 to form a reception seat for the vulcanite expansion stem 17 which has formed therein a fluid port 18. Said adjusting screw 11 has formed on its top thereof a shoulder 19 and a head 20 the object of said head 20 being to provide means adapted to receive a suitable key for adjusting the distance of expansion between the seat 16 on the hood 13 and the inclined surface of expansion stem 17. In order to create a hermetically sealed cavity for adjusting screw 11 a sufficient amount of packing 21 is placed beneath shoulder 19 surrounding the shank of adjusting screw 11 within the wall of shoulder 8 on primary cap 7. Said expansion stem 17 is mounted at its lower end on auxiliary supporting base 22 which is provided with a depending threaded shoulder 23 adapted to engage the correspondingly threaded surface in base 24 of valve casing 6. Said auxiliary base 22 has also cut therein a fluid passageway 25 communicating with vent port or fluid passageway 18 in expansible stem 17. The lower end of base 24 is externally threaded to receive coupling 26 which carries air line pipe connection 27 provided with a fluid passageway 28 communicating with the vent passageway 25 in auxiliary base 22. Said base 24 has also cut therein a recess 29 adapted to receive the head of air line pipe connection 27. The communication between the interior recesses of radiator 1 and chamber 5 of valve casing 6 is substantially on a line with the base of the expansion stem 17 thus rendering the device one wherein a perfect expansion of fluids under pressure is had.

The operation of the device is as follows: When suitably connected up with a means of radiation and an air line pipe connection the fluids in the means of radiation pass therefrom to chamber 5 of valve casing 6 causing expansion stem 17 to expand when the vent controlling screw 11 is adjusted to the proper degree of adjustment. During expansion the foul airs as found in a means of radiation, together with any escaping condensation, are carried away from the means of radiation and air valve by means of the pipe air line connection.

It is obvious that the device need not be limited to the structural features as shown but may be varied in many ways without departing from the spirit of the invention.

What I claim and desire to secure by Letters Patent of the United States is:—

A device of the character described comprising a casing having a connection forming a communication between a radiator and the interior recesses of said casing and on its bottom a reception nipple, a primary cap rigidly mounted on said casing, an air vent adjusting screw supported in said primary cap, a packing ring surrounding said air vent adjusting screw beneath the head thereof, a conical hood carried by said screw within said casing adapted to act as a stop for the vertical movement of said screw, a secondary cap or protective housing detachably mounted on said primary cap open at its end and projecting above said adjusting screw adapted to permit of access thereto, an expansible stem mounted in said casing and adjustable with relation to the conical hood carried by said adjusting screw, and an air line pipe connection mounted on said reception nipple provided with a passageway forming a means of communication with the interior recesses of said casing.

In testimony whereof I have hereunto signed my name in the presence of two subscribing witnesses.

FREDERICK H. SAUER.

Witnesses:
R. W. ASHLEY,
LAURA E. SMITH.

---

Copies of this patent may be obtained for five cents each, by addressing the "Commissioner of Patents, Washington, D. C."